(12) United States Patent
Blessing et al.

(10) Patent No.: US 6,902,357 B2
(45) Date of Patent: Jun. 7, 2005

(54) CUTTING TOOL

(75) Inventors: Matthias Blessing, Frastanz (AT); Werner Wanger, Mauren (LI)

(73) Assignee: Hilti Aktiengesellschaft, Schaan (LI)

( * ) Notice: Subject to any disclaimer, the term of this patent is extended or adjusted under 35 U.S.C. 154(b) by 190 days.

(21) Appl. No.: 10/208,524

(22) Filed: Jul. 29, 2002

(65) Prior Publication Data

US 2003/0026668 A1 Feb. 6, 2003

(30) Foreign Application Priority Data

Aug. 1, 2001 (DE) .......................................... 101 37 747

(51) Int. Cl.$^7$ .............................................. B23B 51/04
(52) U.S. Cl. ........................... 408/204; 407/41; 407/50; 408/232
(58) Field of Search ................................. 408/204, 205, 408/206, 207, 208, 209, 703, 231, 232; 407/41, 49, 50, 108, 109, 110

(56) References Cited

U.S. PATENT DOCUMENTS

| | | | | |
|---|---|---|---|---|
| 447,900 A | * | 3/1891 | Pallen | 407/45 |
| 534,220 A | * | 2/1895 | Kent | 407/43 |
| 867,275 A | * | 10/1907 | Hunter | 407/45 |
| 899,608 A | * | 9/1908 | Newbold | 407/8 |
| 1,391,097 A | | 9/1921 | Cowles | |
| 1,460,029 A | * | 6/1923 | Mattson | 407/41 |
| 1,707,903 A | * | 4/1929 | Charlton | 83/845 |
| 2,085,095 A | * | 6/1937 | Grattan | 407/38 |
| 2,092,984 A | * | 9/1937 | Muth | 408/229 |
| 2,498,721 A | * | 2/1950 | Stafford | 407/25 |
| 2,810,189 A | * | 10/1957 | See et al. | 407/31 |
| 2,950,523 A | * | 8/1960 | Frommelt et al. | 407/118 |
| 3,065,658 A | * | 11/1962 | Gross | 83/673 |
| 4,626,143 A | * | 12/1986 | Rembold | 408/82 |
| 5,451,128 A | * | 9/1995 | Hattersley | 408/204 |
| 2003/0099519 A1 | * | 5/2003 | Robinson et al. | 407/50 |

FOREIGN PATENT DOCUMENTS

CA  483587  *  5/1952  .................. 407/49

OTHER PUBLICATIONS

Derwent Publication of an Abstract of f. Soviet Union Patent No. 1,433,650, Oct. 30, 1998, no drawing.

* cited by examiner

*Primary Examiner*—Daniel W. Howell
(74) *Attorney, Agent, or Firm*—Sidley Austin Brown & Wood, LLP

(57) ABSTRACT

A rotatable cutting tool having s support region (1) with an end surface (2) and a plurality of recesses (4) extending from the end surface (2) and in which, respectively, a plurality of cutting elements (5) are arranged, with each recess having a rigid stop surface (7) for a cutting element (5) and faces in a rotational direction (R) of the tool, and a gripping surface (8) facing in a direction opposite the tool rotational direction (R) and cooperating with the cutting element, with the gripping surface (8) being displaceable by a respective locking element in the direction opposite the tool rotational direction.

11 Claims, 3 Drawing Sheets

CUTTING TOOL

BACKGROUND OF THE INVENTION

1. Field of the Invention

The present invention relates to a rotatable cutting tool including a receiving region, a support region having an end surface remote from the receiving region and a plurality of circumferentially spaced from each other, recesses formed in the support region and extending from the end surface in a direction toward the receiving region, a plurality of cutting elements arranged in respective recesses, and a plurality of locking elements displaceable in a direction substantially parallel to a longitudinal extent of the recesses for securing respective cutting elements in the respective recesses.

2. Description of the Prior Art

U.S. Pat. No. 3,308,689 discloses a cutting tool having a tubular support region provided with a plurality of recesses which extend from the end surface of the support region in a direction toward a receiving region. In each of the recesses, there is located a cutting element formed of a hard material. Each cutting element is secured by a tightening screw displaceable parallel to the central axis of the support region. The tightening screw extends through a bore formed in the cutting element and is screwed in a threaded bore formed in the support region until the head of the tightening screw is located in a widened region of the cutting element bore, securing the cutting element to the support region.

The bore, which is formed in the cutting element, weakens the cutting element. Such cutting elements are unsuitable for cutting very hard materials. Moreover, the cutting element should be larger than the head of the tightening screw.

Accordingly, an object of the present invention is to provide a rotatable cutting tool capable of cutting very hard materials.

Another object of the present invention is to provide a rotatable cutting tool in which the cutting elements can be rapidly and simply replaced.

A further object of the present invention is to provide a rotatable cutting tool in which the cutting elements are reliably secured in the support region and are able to withstand high loads.

SUMMARY OF THE INVENTION

These and other objects of the present invention, which will become apparent hereinafter, are achieved by providing a cutting tool in which each recess has a rigid stop surface for the cutting element and which is formed by the support region and faces in a rotational direction of the tool, and a gripping surface facing in a direction opposite the tool rotational direction and cooperating with the cutting element. The gripping surface forms part of a segment-shaped section of the support region and is displaceable by a respective locking element in the direction opposite the tool rotational direction.

The securing of a cutting element to the support region according to the present invention insures its simple, very rapid, and reliable replacement. The facing in the direction opposite to the rotational direction, gripping surface of the segment-shaped section of the support region transmits the locking forces, which are generated by the tightening screw, to the cutting element in form of compressive forces over a large surface of the cutting element. Therefore, no increase in stresses in the cutting element takes place which stresses can cause rupture of the cutting element. Further, the gripping surface abuts the cutting element over a large area without any clearance therebetween, which prevents the penetration of the cut material therebetween.

The stop surface absorbs the main cutting forces, and the forces, which act on the cutting element in a direction parallel to the longitudinal extent of the recess, are absorbed by a stop formed by the bottom of the recess. Instead of a rigid stop, an adjustable threaded pin can be used which projects in a corresponding threaded bore. An adjustable stop permits to readjust the position of the cutting element upon the wear of the cutting element. Such arrangement of the cutting element prevents damage of the cutting edges. The segment-shaped section of the support region is integrally connected with the remaining portion of the support region by an elastic flector.

A rapid displacement of the locking element between the release and locking positions of the cutting element in advantageously insured by forming the locking element as a tightening screw which projects into a threaded bore extending parallel to the longitudinal extend of the recess in which the cutting element is arranged. The tightening screw can be easily and rapidly screwed in or unscrewed with an appropriate tool. To this end, the tightening screw can be provided with an inner hexagon or too.

When a cutting element is secured in a recess, the segment-shaped section of the support region is displaced toward the cutting element, pressing the cutting element against the stop surface which is formed by the support region and faces in the rotational direction of the tool. The segment-shaped section is displaced upon the tightening screw being screwed in the threaded bore. The segment-shaped section is displaced by a region, which is provided on the tightening screw and expands in a tool operational direction, and/or an adjacent, to the screw, region of the segment-shaped section and tapering inward in the tool operational direction. The region on the tightening screw, which widens or expands in the tool operational direction, is formed by the head of the tightening screw having a conical outer profile. The recesses and the segment-shaped section can extend, in the direction from the end surface towards the receiving region, at an angle. This permits to provide on the cutting elements, which are secured in the recesses, different clearance angles and face angles.

By providing a plurality of indentations, which are formed in the end surface, adjoin respective recesses at a side of the respective recesses remote from the stop surface, and extend each in the tool rotational direction by a distance greater than a distance between a respective tightening screw and the gripping surface of the respective recess, a convenient space is provided for removing chips from the cutting element.

In order to insure a proper spacing of the gripping surface and the cutting element, on one hand, and to reliably remove the chips from the cutting element, on another hand, the depth of the indentation, which is measured from the end surface, increases in the tool rotational direction. The depth increase takes place only in the region between the tightening screw and the gripping surface.

The distance between the free end surface of the tightening screw head and the end surface of the support region corresponds, in the tightening condition of the screw substantially to the largest depth of the indentation. This insures that the screw head would not interfere with the chip removal.

In order to insure that the cutting tool, when formed as a core bit, is able to form large diameter bores, the support region is made tubular, with the end surface being formed by the end region of the support region remote from the receiving region. The removal of the cut material is noticeably increases or improved when the receiving region is provided on its inner and/or outer side with at least one helice, respectively.

The cutting elements are generally so arranged that they project, in the operational direction of the tool, beyond the end surface of the support region and beyond the inner and outer sides of the support region. Such arrangement of the cutting elements insures free cutting and prevents jamming of the cutting tool. The cutting elements can project further beyond the inner side of the support region than beyond its outer side.

When the inventive cutting tool is used in a power drill with an integrated or external suction device, it should be insured that a sufficiently large suction flow is available to insure suction of the cut material from the interior of the support region. When a bore is formed with the inventive tool, the aspirated, from outside, air can reach the interior of the support region only through indentations formed in the end surface of the support region. In order to increase the volume of the suction flow, the support region has at least one opening extending through the support region behind a respective recess and transverse to the tool rotational direction.

For manufacturing reason, the opening is formed as an elongate slot adjoining the respective recess. The width of the opening in the rotational direction is smaller than the width of the recess. When the support region has a shape of a disc, the disc circumference forms the end surface.

The cutting elements of the inventive tool can have each one, two oppositely located, or four cutting edges. A cutting element with one or two cutting edges can have a rectangular shape. The cutting elements with four cutting edges have a square shape.

The cutting elements of the inventive tool can be formed, e.g., with a polycristal diamond or hard metal layer.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 2:
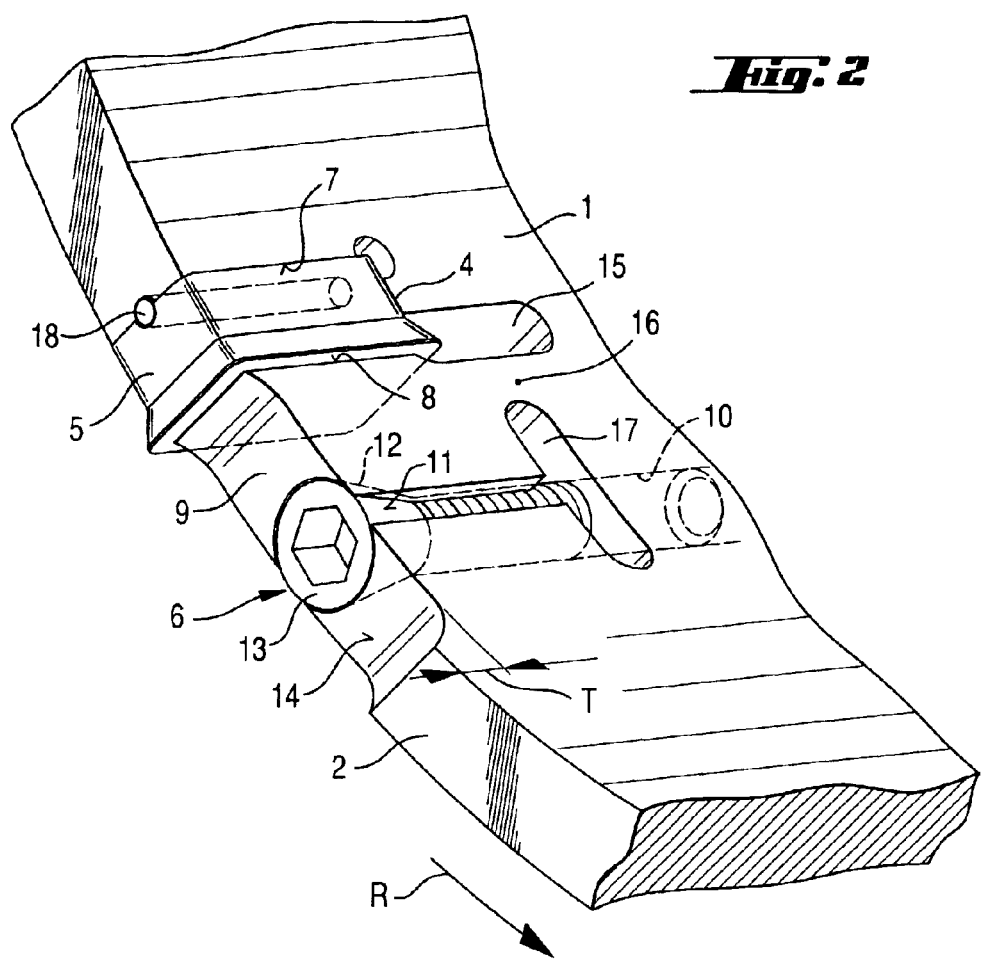
FIG. 2 a view of Section A of the tool shown in FIG. 1 at an increased, in comparison with FIG. 1, scale.
Figure 3:
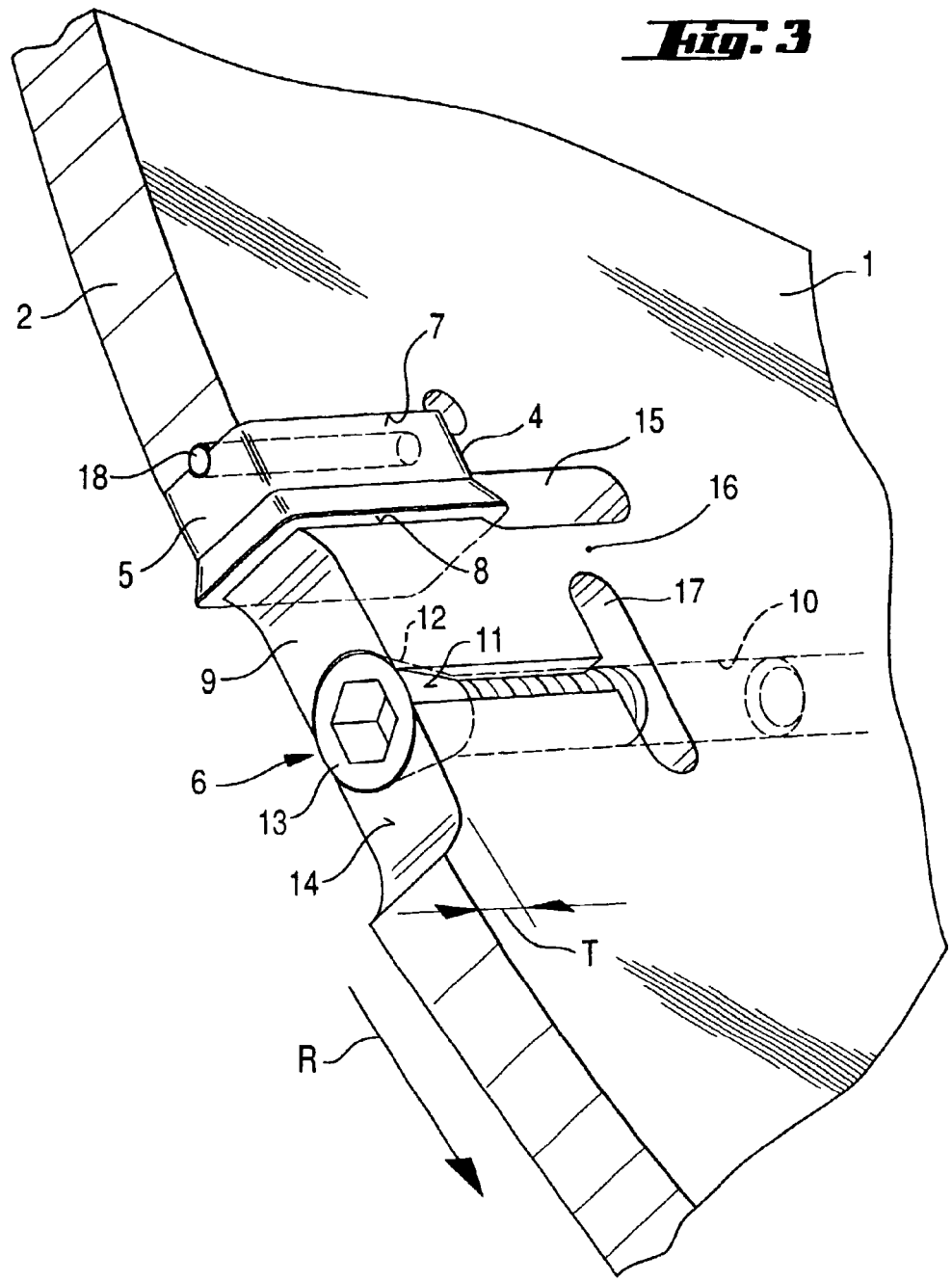
FIG. 3 a perspective view of a section of a further tool according to the present invention with a disc-shaped support region.

The present invention will now be explained in detail with reference to particular embodiments of the inventive cutting tool shown in FIGS. 1–3 which show a core bit (FIGS. 1–2) and a circular saw blade (FIG. 3). For simplicity sake, the same reference numerals are used in FIGS. 1–2 and FIG. 3.

Figure 1:
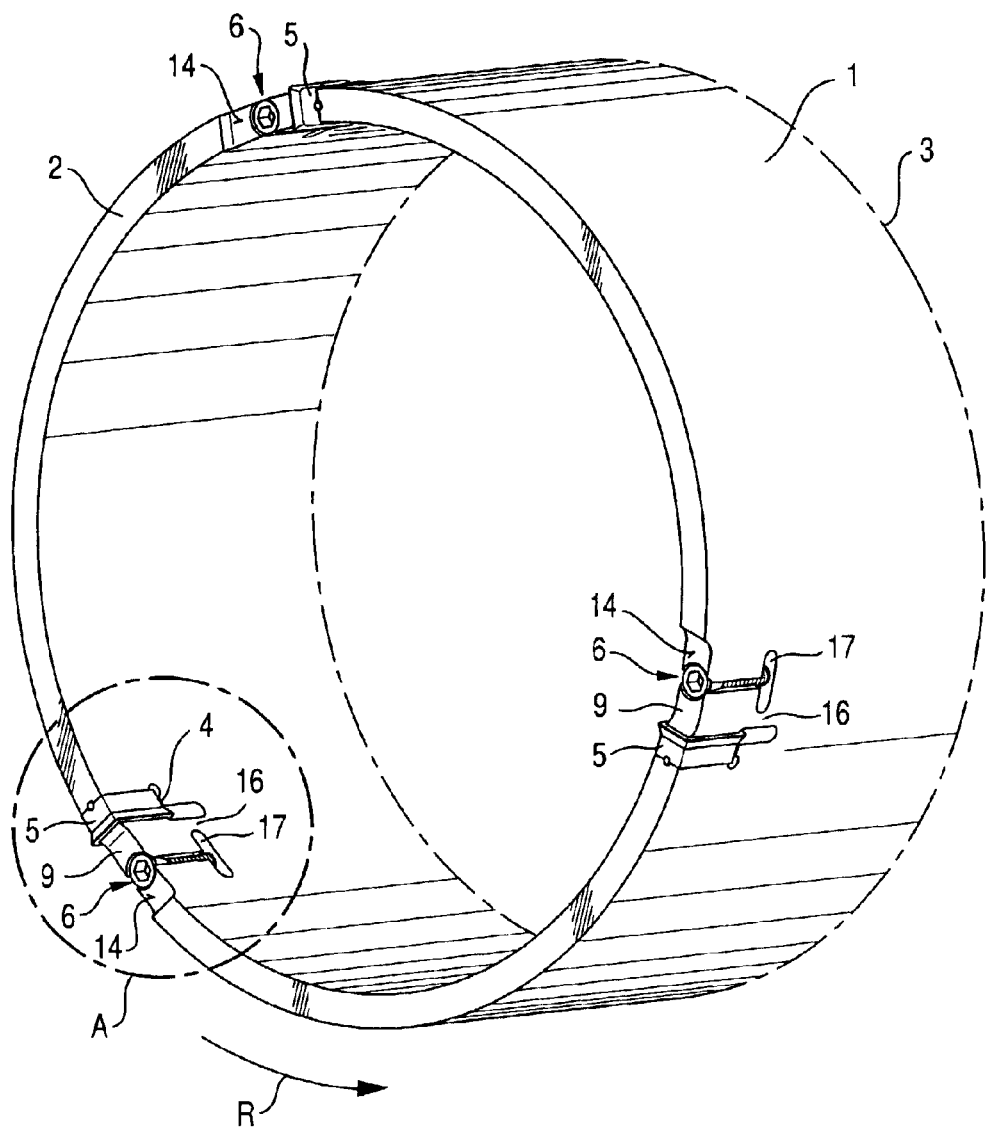
FIG. 1 a perspective view of a cutting tool according to the present invention with a tubular support region.

A rotatable cutting tool, which is shown in FIGS. 1–3, has a receiving region 3 and a support region 1 having an end surface 2 remote from the receiving region 3. A plurality of recesses 4 extend partially over the support region in a direction toward the receiving regions 3. In each of the recesses 4, there is located a cutting element 5 which is secured by a locking element, e.g., in form of a tightening screw 6 displaceable substantially parallel to the longitudinal extent of the recess 4. Each recess 4 has a rigid stop surface 7 for the cutting element 5. The stop surface 7 is formed by the support region 1 and faces in a rotational direction R of the tool. Each recess 4 further has a gripping surface 8 which faces in a direction opposite the tool rotational direction R and cooperates with the cutting element 5. The gripping surface 8 forms part of a segment-shaped section 9 of the support region 1 and is displaceable by the tightening screw 6 in the direction opposite to the tool rotational direction R. The tightening screw 6 extends in a threaded bore 10 formed in the support region 1 and extending in a direction substantially parallel to the longitudinal extent of the recess 4.

The segment-shaped section 9 is displaced, upon the tightening screw 6 being screwed into the threaded bore, by the head 13 of the screw 6. The screw head 13 has a widening, in an operational direction of the cutting tool, region 11 in form of a conical profile which cooperates with a tapering inward, in the tool operational direction, region 12 of the segment-shaped section 9. An indentation 14, which is formed in the end surface 2 of the support region 1, adjoins the recess 4 at its side remote from the rigid stop surface 7. The indentation 14 extends in the tool rotational direction R by a distance greater than the distance between the tightening screws 6 and the gripping surface 8. The depth T of the indentation 14, which is measured form the end surface 2, increases in the rotational direction R, from the recess 4 toward the tightening screw 6.

Both the receiving region 3 and the support region 1 in the tool shown in FIGS. 1–2 are formed as tubular regions. The end surface 2 is formed at the free end of the support region, with the cutting elements 5 projecting past the end surface 2. The support region 1 is provide with a plurality of openings 15. Each of the opening 15 adjoins, in a direction parallel to the longitudinal extent of the tool, a respective recess 4. Each opening 15 is formed as an elongate slot the extent or width of which in the tool rotational direction R is smaller than the extent or width of the recess 4. The support region 1 is further provided with a plurality of openings 17 arranged circumferentially adjacent to respective openings 15. Each of the opening 17 forms, with the adjacent opening 15, an articulation 16 which is elastically deformable by the tightening screw 6.

In the tool shown in FIG. 3, both the receiving region 3 and the support region 1 are disc-shaped. The end surface 2, in the tool shown in FIG. 3, is formed by the circular surface of the support region 1.

In order to prevent transverse forces, which occasionally occur, from forcing the cutting element 5 sidewise of the recess 4 or transverse to the longitudinal extent of the recess 4, there is provided a formlocking connection of the cutting element 5 with the rigid stop surface 7 and/or with the gripping surface 8. The formlocking connection can be effected, e.g., with a cylindrical pin 18 extending into corresponding grooves formed in the cutting element 5 and a respective, e.g., stop surface 7.

Through the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, an the present invention includes all variations and/or alternative embodiments with the spirit and scope of the present invention as defined by the appended claims.

What is claims is:

1. A rotatable cutting tool, comprising a receiving region (3); a tubular-shaped support region (1) having an end surface (2) remote from the receiving region (3) and a plurality of circumferentially spaced from each other, recesses (4) formed in the support region and extending from the end surface (2) in a direction toward the receiving region (3); a plurality of cutting elements (5) arranged in respective recesses (4); and a plurality of locking elements displaceable in a direction substantially parallel to a longitudinal extent of the recesses (4) for securing respective cutting elements (5) in the respective recesses (4), wherein each recess (4) has a rigid stop surface (7) for a cutting element (5) and which is formed by the support region (1) and faces in a rotational direction (R) of the tool, and a gripping surface (8) facing in a direction opposite the tool rotational direction (R) and cooperating with the cutting element, the gripping surface (8) forming part of a segment-shaped section (9) of the support region and being displaceable by a respective locking element in the direction opposite the tool rotational direction (R).

2. A cutting tool according to claim 1, wherein the locking elements are formed as tightening screws, and wherein the support region (1) has a plurality of threaded bores (10) extending substantially parallel to the longitudinal extent of the recesses (4) and into which the tightening screws extend, respectively.

3. A cutting tool according to claim 2, further comprising means for displacing segment-shaped section (9) and, thereby, the gripping surface (8) upon the tightening screw (6) being screwed the respective threaded bore (10), the displacing means comprising at least one of a region (11) provided on the tightening screw (6) and expanding in an operational direction of the tool, and an adjacent region (12) of the segment-shaped section (9) and tapering inward in the tool operational direction.

4. A cutting tool according to claim 3, wherein the tightening screw region (11) is formed by a head (13) of the tightening screw (6) and having a conical outer profile.

5. A rotatable cutting tool, comprising a receiving region (3); a support region (1) having an end surface (2) remote from the receiving region (3) and a plurality of circumferentially spaced from each other, recesses (4) formed in the support region and extending from the end surface (2) in a direction toward the receiving region (3); a plurality of cutting elements (5) arranged in respective recesses (4); and a plurality of locking elements displaceable in a direction substantially parallel to a longitudinal extent of the recesses (4) for securing respective cutting elements (5) in the respective recesses (4), wherein each recess (4) has a rigid stop surface (7) for a cutting element (5) and which is formed by the support region (1) and faces in a rotational direction (R) of the tool, and a gripping surface (8) facing in a direction opposite the tool rotational direction (R) and cooperating with the cutting element, the gripping surface (8) forming part of a segment-shaped section (9) of the support region and being displaceable by a respective locking element in the direction opposite the tool rotational direction (R), and wherein the support region (1) comprises a plurality of indentions (14) formed in the end surface (2) and adjoining respective recesses (4) at a side of the respective recesses (4) remote from the stop surface (7), the indentations (14) extending each in the tool rotational direction (R) by a distance greater than a distance between a respective tightening screw (6) and the gripping surface of the respective recess (4).

6. A cutting tool according to claim 5, wherein each indentation (14) has a depth (T), measured from the end surface (2) and which increases in the rotational direction (R) from the respective recess (4) toward the respective tightening screw (6).

7. A cutting tool according to claim 1, further comprising means (18) for formlockingly securing the cutting elements (5) in respective recesses (7).

8. A cutting tool according to claim 5, further comprising means (18) for formlockingly securing the cutting elements (5) in respective recesses (7).

9. A rotatable cutting tool, comprising a receiving region (3); a support region (1) having an end surface (2) remote from the receiving region (3) and a plurality of circumferentially spaced from each other, recesses (4) formed in the support region and extending from the end surface (2) in a direction toward the receiving region (3); a plurality of cutting elements (5) arranged in respective recesses (4); and a plurality of locking elements displaceable in a direction substantially parallel to a longitudinal extent of the recesses (4) for securing respective cutting elements (5) in the respective recesses (4), wherein each recess (4) has a rigid stop surface (7) for a cutting element (5) and which is formed by the support region (1) and faces in a rotational direction (R) of the tool, and a gripping surface (8) facing in a direction opposite the tool rotational direction (R) and cooperating with the cutting element, the gripping surface (8) forming part of a segment-shaped section (9) of the support region and being displaceable by a respective locking element in the direction opposite the tool rotational direction (R), and wherein the support region (1) comprises a plurality of first openings (15) extending behind respective recesses (4), and a plurality of second openings (17) located circumferentially adjacent to respective first openings (15) and forming therebetween articulations (16) elastically deformable by respective tightening screws (6).

10. A cutting tool according to claim 9, further comprising means (18) for formlockingly securing the cutting elements (5) in respective recesses (7).

11. A rotatable cutting tool, comprising a receiving region (3); a support region (1) having an end surface (2) remote from the receiving region (3) and a plurality of circumferentially spaced from each other, recesses (4) formed in the support region and extending from the end surface (2) in a direction toward the receiving region (3); a plurality of cutting elements (5) arranged in respective recesses (4); and a plurality of locking elements displaceable in a direction substantially parallel to a longitudinal extent of the recesses (4) for securing respective cutting elements (5) in the respective recesses (4), wherein each recess (4) has a rigid stop surface (7) for a cutting element (5) and which is formed by the support region (1) and faces in a rotational direction (R) of the tool, and a gripping surface (8) facing in a direction opposite the tool rotational direction (R) and cooperating with the cutting element, the gripping surface (8) forming part of a segment-shaped section (9) of the support region and being displaceable by a respective locking element in the direction opposite the tool rotational direction (R), and wherein each recess (4) has opposite rigid stop surface (7) and gripping surface (8), and the cutting tool includes means for formlockingly connecting a respective cutting element (5) with at least one of the rigid stop surface (7) and the gripping surface (8) of a respective recess (4), wherein the formlockingly connecting means comprises a cylindrical pin (18) extending into complementary grooves formed in the respective cutting element (5) and the at least one of the rigid stop surface and the gripping surface of the respective recess.

* * * * *